(12) United States Patent
Eichler (10) Patent No.: US 7,258,131 B2
(45) Date of Patent: Aug. 21, 2007

(54) SAFETY VALVE

(76) Inventor: Donald Gary Eichler, 11 Stony Trail, Edmond, OK (US) 73034

( * ) Notice: Subject to any disclaimer, the term of this patent is extended or adjusted under 35 U.S.C. 154(b) by 163 days.

(21) Appl. No.: 11/220,080

(22) Filed: Sep. 6, 2005

(65) Prior Publication Data

US 2007/0051408 A1 Mar. 8, 2007

Related U.S. Application Data

(60) Provisional application No. 60/707,908, filed on Aug. 12, 2005.

(51) Int. Cl.
*F16K 17/30* (2006.01)
(52) U.S. Cl. ..................... 137/460; 137/504
(58) Field of Classification Search ............. 137/517, 137/503, 460
See application file for complete search history.

(56) References Cited

U.S. PATENT DOCUMENTS

| 755,996 | A | * | 3/1904 | Brune ................. 137/517 |
| 2,556,613 | A | * | 6/1951 | Carter ................. 137/460 |
| 3,794,077 | A | | 2/1974 | Fanshier |
| 4,590,962 | A | * | 5/1986 | Tespa ................. 137/498 |
| 5,004,008 | A | * | 4/1991 | Drucker .............. 137/504 |
| 5,215,113 | A | | 6/1993 | Terry |
| 5,613,518 | A | | 3/1997 | Rakieski |
| 5,983,928 | A | | 11/1999 | Hsiao |
| 6,199,583 | B1 | | 3/2001 | Incovella |
| 6,357,415 | B1 | | 3/2002 | Mori |
| 6,390,199 | B1 | | 5/2002 | Heijnen |
| 6,405,751 | B1 | | 6/2002 | Hsiao |
| 6,792,972 | B2 | | 9/2004 | Poulsen |
| 6,857,440 | B2 | | 2/2005 | Lind |

* cited by examiner

*Primary Examiner*—Stephen M. Hepperle
(74) *Attorney, Agent, or Firm*—Martin A. Weeks (57) ABSTRACT

The invention is for a safety valve for a piping system. The safety valve has a cylindrical housing, a piston assembly with two disc-shaped pistons, each piston having at least one orifice defined therein, a shaft connecting the pistons, a valve stem, and a stop attached to one end of the valve stem. The safety valve has a valve seat with an opening shaped and sized to receive the stop. The safety valve has a spring positioned in the housing against the piston assembly so that the spring exerts a spring force on the second piston in a direction opposite the direction of fluid flow. When fluid forces acting on the piston assembly exceed a spring force acting on the piston assembly, the piston assembly moves in the direction of flow until the stop engages the valve seat and shuts off flow through the safety valve.

20 Claims, 8 Drawing Sheets

SAFETY VALVE

CROSS-REFERENCE TO RELATED APPLICATIONS

This application relates to U.S. Provisional Application No. 60/707,908, filed Aug. 12, 2005.

BACKGROUND OF THE INVENTION

Pipelines are commonly used to transport fluids, both liquids and gases. Millions of miles of pipeline deliver fluids from a point of origin to a point of destination. Two commonly used pipelines are the pipelines that deliver natural gas and liquid petroleum (LP) gas to homes for use in appliances, such as heaters and clothes dryers. The natural gas and LP gas pipelines are two of the most indispensable pipelines in use today.

Both the natural gas and LP gas pipeline are sources of potential disaster if there is a leaky appliance or a catastrophic pipeline failure that causes gas to discharge into the atmosphere. Gas appliances, such as stoves, dryers, and heaters, are known to malfunction in ways that cause gas discharges into homes. Catastrophic pipeline failures usually occur during earthquakes or when earth-moving equipment accidentally strikes a pipeline.

After a gas leak in an appliance or a catastrophic pipeline failure, the flow of gas typically continues until a service worker shuts off the flow of gas by operating a valve upstream of the gas leak. In the meantime, the gas has discharged into the open air or a confined space, such as a home. Discharges into the air are undesirable because such discharges add pollutants to the atmosphere. Discharges of natural gas into a confined space can create deadly accumulations of natural gas that may result in fires and explosions. Because LP gas is heavier than air, discharges of LP gas are dangerous whether the LP gas is discharged into the atmosphere or into a confined space.

It is well known that devices already exist for protecting a house from an overload of electrical current, namely fuses or breakers in a breaker box. It is also desirable to design a similar device for a gas pipeline that allows the gas to flow under normal operating conditions, but which shuts off the flow of natural gas or LP gas when there is an excess flow rate either because of a malfunctioning appliance or because of a catastrophic break in the pipeline.

One example of where a catastrophic break occurs in a fluid line is where a motorist inadvertently drives away from a gas pump or an LP gas supply tank before removing the nozzle or LP gas fitting. When this happens, gasoline is usually spilled on the ground or LP gas is discharged into the air, either of which creates an environmental hazard and a fire hazard. In this example, it is desirable that a device shut off the flow of fluid before either very much gasoline is spilled on the ground or LP gas is discharged into the atmosphere.

It is to solving these problems and others that the present invention is directed.

BRIEF SUMMARY OF THE INVENTION

The present invention is for a safety valve for use with a fluid piping system. The piping system has an upstream portion upstream of the safety valve and a downstream portion downstream of the safety valve. The safety valve has a cylindrical housing through which the fluid flows. The cylindrical housing has a diameter $D_H$ and a length $L_H$.

The safety valve also has a piston assembly with a first disc-shaped piston and a second disc-shaped piston. The first disc-shaped piston has a diameter slightly smaller than the housing diameter so that the first piston freely slides within the housing. The first piston has at least one orifice defined in the first piston. The first piston has an upstream face and a downstream face.

The piston assembly also has a second disc-shaped piston positioned downstream from the first piston. The second piston has a diameter substantially equal to the first piston diameter. The second piston has at least one orifice defined in the second piston. The second piston has an upstream face and a downstream face. Fluid entering the safety valve housing exerts a fluid force on the first piston and the second piston in the direction of fluid flow.

The piston assembly has a shaft connecting the first piston to the second piston. A valve stem extends from the downstream face of the second piston, the second piston being attached to a first end of the valve stem. A stop is attached to a second end of the valve stem.

The safety valve also has a valve seat with an opening substantially shaped and sized to matingly receive the stop. The safety valve also has a spring positioned in the housing against the downstream face of the second piston so that the spring exerts a spring force on the second piston in a direction opposite the general direction of fluid flow. When the fluid forces acting on the piston assembly sufficiently exceed the spring force acting on the downstream face of the second piston, the piston assembly moves in the direction of fluid flow until the stop engages the valve seat and substantially shuts off the fluid flow to the downstream portion of the system piping.

BRIEF DESCRIPTION OF THE DRAWINGS

It is noted that the cross-hatching of a cross section is not intended to indicate the use of a particular material for any of the drawings.

DESCRIPTION

Figure 1:
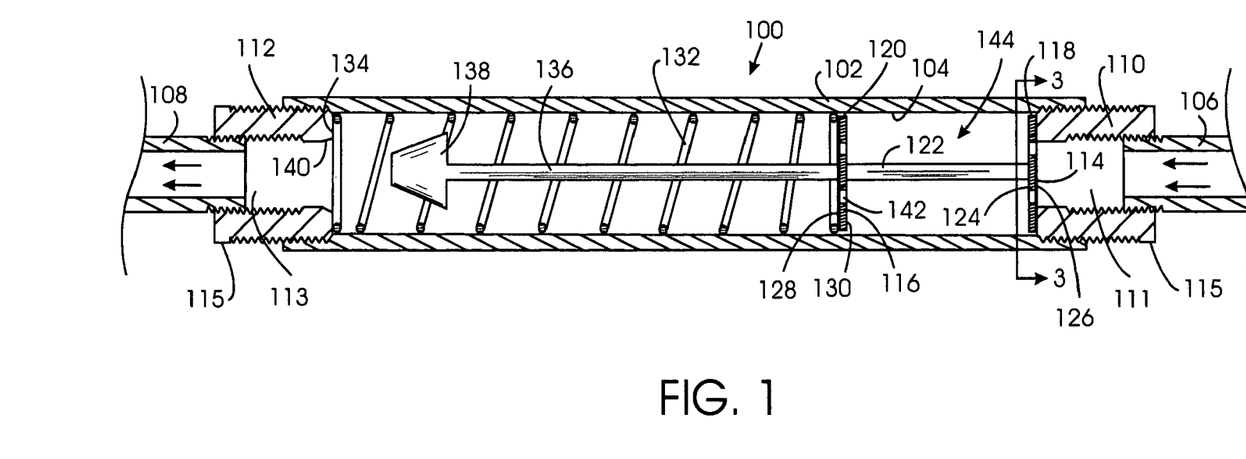
FIG. 1 is a partial cross-sectional view of a safety valve positioned in the open position constructed in accordance with a preferred embodiment of the present invention.
Figure 2:
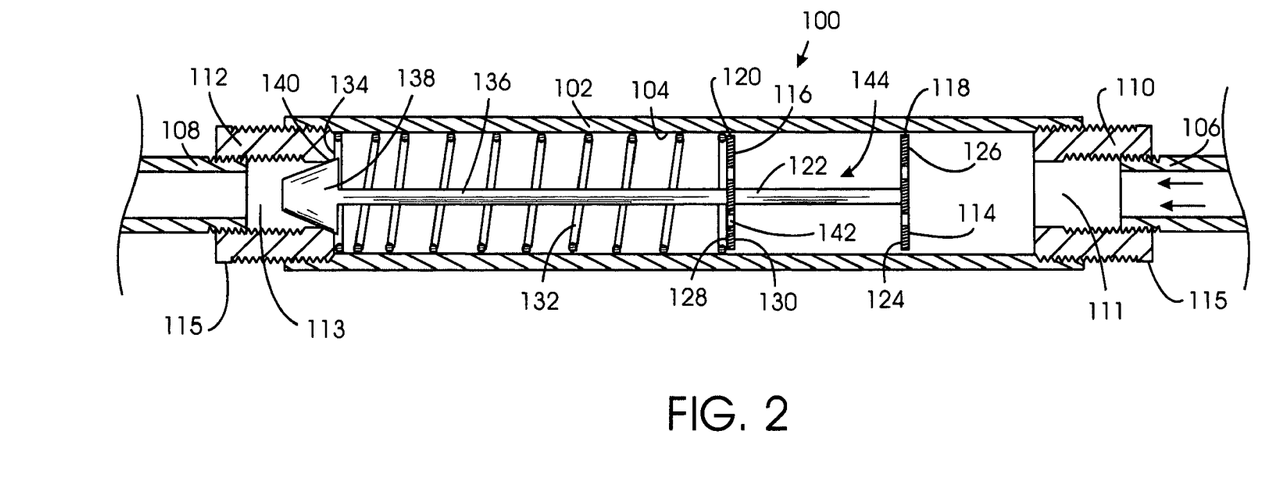
FIG. 2 is a partial cross-sectional view of a safety valve positioned in the closed position constructed in accordance with a preferred embodiment of the present invention.

FIGS. 1-2 show cross-sectional views of a safety valve 100. FIG. 1 shows the safety valve 100 in an open position and FIG. 2 shows the safety valve 100 in a closed position. The safety valve 100 includes a housing 102 with an inner wall 104. The housing 102 is made from a pipe of larger diameter than a diameter of inlet piping 106 upstream of the safety valve 100 and a diameter of outlet piping 108 downstream of the safety valve 100. The safety valve 100 is connected to the inlet piping 106 by an inlet coupler 110 and to the outlet piping 108 by an outlet coupler 112. Fluid flows through an inlet passage 111 defined in the inlet coupler 110, into the housing 102 and, when the safety valve 100 is in the open position, though an outlet passage 113 defined in the outlet coupler 112. The inlet coupler 110 and the outlet coupler 113 each have a hexagonal portion with six flat sides 115 to accommodate a standard wrench.

A disc-shaped first piston 114 and a disc-shaped second piston 116 are positioned in the housing 102, with piston outer walls 118 and 120 having diameters slightly smaller than a diameter of the housing inner wall 104. There are gaps between the piston outer walls 118 and 120 and the housing inner wall 104 that are generally small, but large enough to allow for free sliding of the pistons 114 and 116 within the housing 102. The pistons 114 and 116 are separated by a shaft 122 of length $L_{SH}$. The first piston 114 has a downstream face 124 and an upstream face 126. The second piston 114 has a downstream face 128 and an upstream face 130.

A spring 132 is positioned in the housing 102 between an outlet coupler inner face 134 and the downstream face 128 of the second piston 116. The spring 132 resiliently restrains the sliding of the pistons 114 and 116 in the direction of the outlet coupler inner face 134. The spring 132 has a spring constant K and a length $L_{SP}$.

A valve stem 136 of length $L_{VS}$ extends from the second piston downstream face 128 to support a stop 138. The valve stem 136 is attached at a first end to the second piston 116 and at a second end to the stop 138. As shown in FIGS. 1 and 2, the stop 138 may be integrally formed with the valve stem 136, such as in a casting. The stop 138 may also be a separate piece attached to the valve stem 136. The valve stem 136 is rigidly attached to the second piston 116 so that movement of the second piston 116 causes a like movement of the valve stem 136 and the stop 138. A valve seat 140 is defined in the outlet coupler 112. The valve seat 140 is shaped and sized to receive the stop 138 to form a substantial fluid seal between the stop 138 and the valve seat 140. For the embodiment shown in FIGS. 1-2, all the components of the safety valve 100 are shown in cross-section except for the shaft 122, the valve stem 136, and the stop 138.

Figure 3:
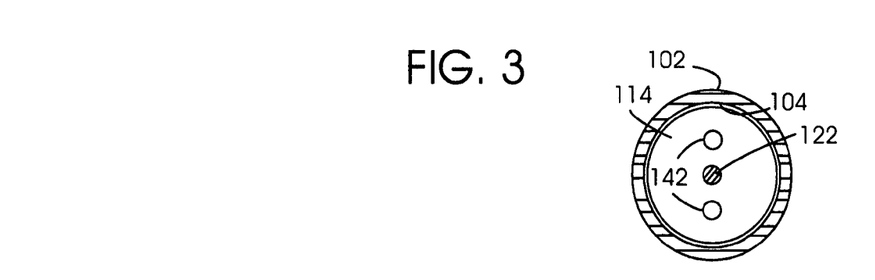
FIG. 3 is the cross-section 3-3 shown in FIGS. 1 and 2.

As best seen in FIG. 3, orifices 142 are defined in the first piston 114. There are two orifices 142 shown in FIG. 3, but if more orifices 142 are required, it is recommended that the orifices 142 be spaced equally about the circular first piston 114. For example, if three orifices 142 are required, the orifices 142 should be spaced with centers at one hundred-twenty degree angles from one another, and with a center of each orifice 142 having the same distance from a center of the first piston 114. The symmetry of the orifices 142 in each piston 114 and 116 is recommended so that the fluid flow field across a diameter of the housing 102 does not develop asymmetries. The second piston 116 generally has orifices 142 defined in positions identical to the first piston 114, but more or less orifices 142 may be provided in the second piston 116 if so desired.

A piston assembly 144 is defined to include the first piston 114, the second piston 116, the shaft 122, the valve stem 136 and the stop 138. The orifices 142 are defined in the piston 114 and 116 to allow the flow of fluid past the pistons 114 and 116 under normal operating conditions. The selection of the size and the number of orifices 142 is discussed below in greater detail.

For the embodiment shown in FIGS. 1-2, the valve seat 140 is made from the outlet coupler 112 that has been externally threaded to fit into internal threads defined in the safety valve outer wall 104. The valve seat 140 has been chamfered to form a geometry that more closely matches that of the stop 138, thus forming a tighter seal between the stop 138 and the valve seat 140.

In one embodiment, the stop 138 and the valve seat 140 have metallic surfaces. Thus, when the stop 138 moves into the valve seat 140, the seal formed by the stop 138 and the valve seat 140 is not an absolute seal. However, the seal so formed substantially blocks the flow of fluid into the outlet piping 108 until a shutoff valve upstream of the safety valve 100 can be closed.

In another embodiment, at least one of the stop 138 and the valve seat 140 are made from a resilient material so that a tighter seal is formed between the stop 138 and the valve seat 140. However, the resilient material selected for the stop 138 or the valve seat 140 must not degrade over time in the presence of the fluid in the piping system. Such resilient materials may include rubber, polymers, plastics, or fibrous material.

The materials generally used to make components for the safety valve 100 may be any suitable material for the transport of the fluid. In the case where the fluid is natural gas, such materials as steel, stainless steel, aluminum, copper, brass and various alloys thereof may be used. Generally, it is expected that the safety valve 100 may be in a natural gas pipeline for decades without the piston assembly being moved to the closed position. Thus, it is highly desirable for the material selected for use be resistant to rust and corrosion. Such materials include aluminum, stainless steel, composites and alloys thereof. Special consideration in the selection of materials must also be made when the valve is used in a high temperature or a low temperature environment and when the fluid flowing through the safety valve has a high or low operating temperature. In some applications involving high precision, the piston assembly may be made from light-weight carbon fiber materials.

In other applications, such as water transport, the safety valve 100 may also be made of the metallic materials listed above, but also may be made from plastic, polymers, or composite materials.

In operation, an excess flow rate caused by a leaky appliance or a catastrophic failure of piping downstream of the safety valve 100 creates a loss of pressure downstream of the safety valve 100, which in turns creates a pressure difference between the upstream piping 106 and the downstream piping 108. This pressure difference causes the pistons 114 and 116 to slide in a direction aligned with the fluid flow through the safety valve 100. Thus, the piston 116 is pushed toward the valve seat 140 by the fluid flow forces, with the fluid forces exerted on the pistons 114 and 116 being counteracted by the force exerted by the spring 132 on the second piston 116. When the piston 116 moves toward the outlet coupler 112, the stop 138 in turn moves toward the valve seat 140. As shown in FIG. 1, the stop 138 is generally frustro-conical in shape. However, the stop 138 may be any shape so long as it is shaped and sized to matingly engage the valve seat 140. When the pressure difference between the inlet piping 106 and the outlet piping 108 exceeds a critical pressure difference, the stop 138 seats in the valve seat 140, the safety valve 100 is in a closed position and fluid flow through the safety valve 100 stops, as represented in FIG. 2.

It is well known that a breaker box for an electrical supply line shut off the supply to an electrical circuit provided to a house when the current exceeds a certain level. Similarly, the safety valve 100 closes when the flow rate through the valve exceeds a certain critical flow rate.

The use of the first piston 114 and the second piston 116 spaced apart by a shaft 122 allows one to use a much lighter piston assembly, as compared to a solid-body piston with elongated holes, as taught by U.S. Pat. No. 5,215,113, issued to Terry on Jun. 1, 1993 (Terry). Because the pistons 114 and 116 are disc-shaped, it is also much easier to drill through the pistons 114 and 116 to create the orifices 142, as compared to the difficulty for drilling holes in the solid-body piston.

The use of two spaced-apart pistons 114 and 116 attached to a shaft 122 is a more stable structure, with respect to keeping the valve stem 136 and the stop 138 in the middle of the housing 102, as compared with using a single disc-shaped piston with a valve stem and stop. Generally, it is expected that the two disc-shaped pistons 114 and 116 will have less friction with the inner walls of the housing 104 than would the outer edges of the solid-body piston assembly taught by Terry, because the two spaced-apart pistons 114 and 116 would generally have less of a total surface area in contact with the housing inner wall 104.

Another advantage over the solid-body piston is that two disc-shaped, spaced apart pistons are much lighter than a solid body occupying the same volume. This is particularly important when the safety valve 100 is used in an application requiring high precision in low pressure gas pipes. These applications occur, for example, when one wishes to monitor home appliances for excess gas flow.

For these applications, one wishes to know when excess gas is flowing to an appliance because it may indicate a leak in the appliance or one of the appliance's gas fittings. By using a low-mass piston assembly in conjunction with a very low spring constant, the safety valve 100 may be used to sense and respond to very small changes in pressure. It is well known in fluid mechanics that for a given flow geometry and fluid, the pressure can be directly correlated to a flow rate. Thus, the safety valve 100 may be designed to shut down the flow when a small increase in gas flow rate occurs downstream of the safety valve.

Reducing the mass of the piston assembly makes the safety valve 100 more sensitive to small pressure changes in part because the fluid forces acting on the piston assembly 144 must overcome inertia to move the piston assembly 144 from the open position to the closed position. Reducing the mass of the piston assembly 144 would clearly lessen the amount of force required to overcome the inertia of the piston assembly 144.

It is also recommended that, for applications requiring high precision, the safety valve 100 should be installed on piping in the horizontal position. Otherwise, the weight of the piston assembly 144 may affect the flow rate at which the safety valve will close. If the valve is installed in a vertical position, the weight of the piston assembly 144 must be accounted for in selecting a spring 132 and an orifice size 142 for the first piston 114 and the second piston 116.

Figure 4:
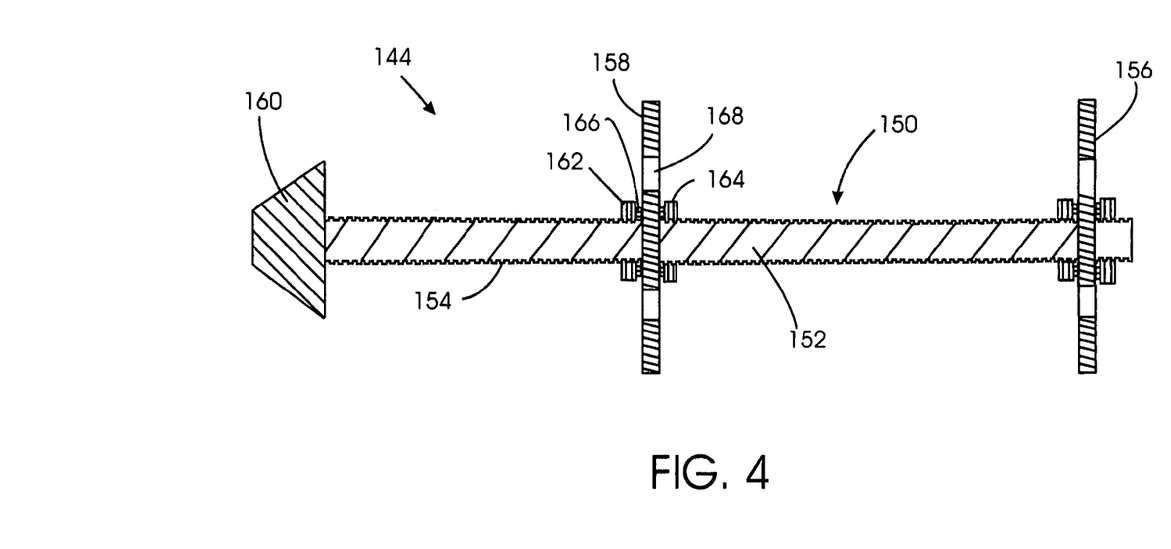
FIG. 4 is a cross-sectional view of a piston assembly constructed in accordance with a preferred embodiment of the present invention.

FIG. 4 shows a cross sectional view of another embodiment of the piston assembly 144 of the safety valve 100. In this embodiment, the piston assembly 144 is made from generally off-the-shelf mechanical hardware and piping hardware. In FIG. 4, a threaded rod 150 is used to form a threaded shaft 152 and a threaded valve stem 154 for the safety valve 100. A first flat washer 156 and a second flat washer 158 acts as the pistons 114 and 116 shown in FIGS. 1-3. An internally threaded nose cone 160 screws onto an end of the threaded rod to act as the stop 138 to fit matingly with the valve seat 140. The flat washers 156 and 158 are secured on the threaded rod 150 by tightening a first nut 162 against a second nut 164 on the threaded rod 150, with two lock washers 166 and one of the flat washers 156 and 158 positioned between the two nuts 162 and 164.

The flat washers 156 and 158 have holes 168 defined therein through which fluid flows. In operation, the threaded rod 150 acts identically to the valve stem and shaft shown in FIGS. 1-2, with the flat washers 156 and 158 being the first piston 114 and the second piston 116. The nose cone 160 acts identically to the stop 138 of FIGS. 1-2 to matingly engage the valve seat 140 to stop the fluid flow when the force exerted by the fluid on the flat washers 156 and 158 sufficiently exceeds the force exerted by the spring 132.

Figure 5:
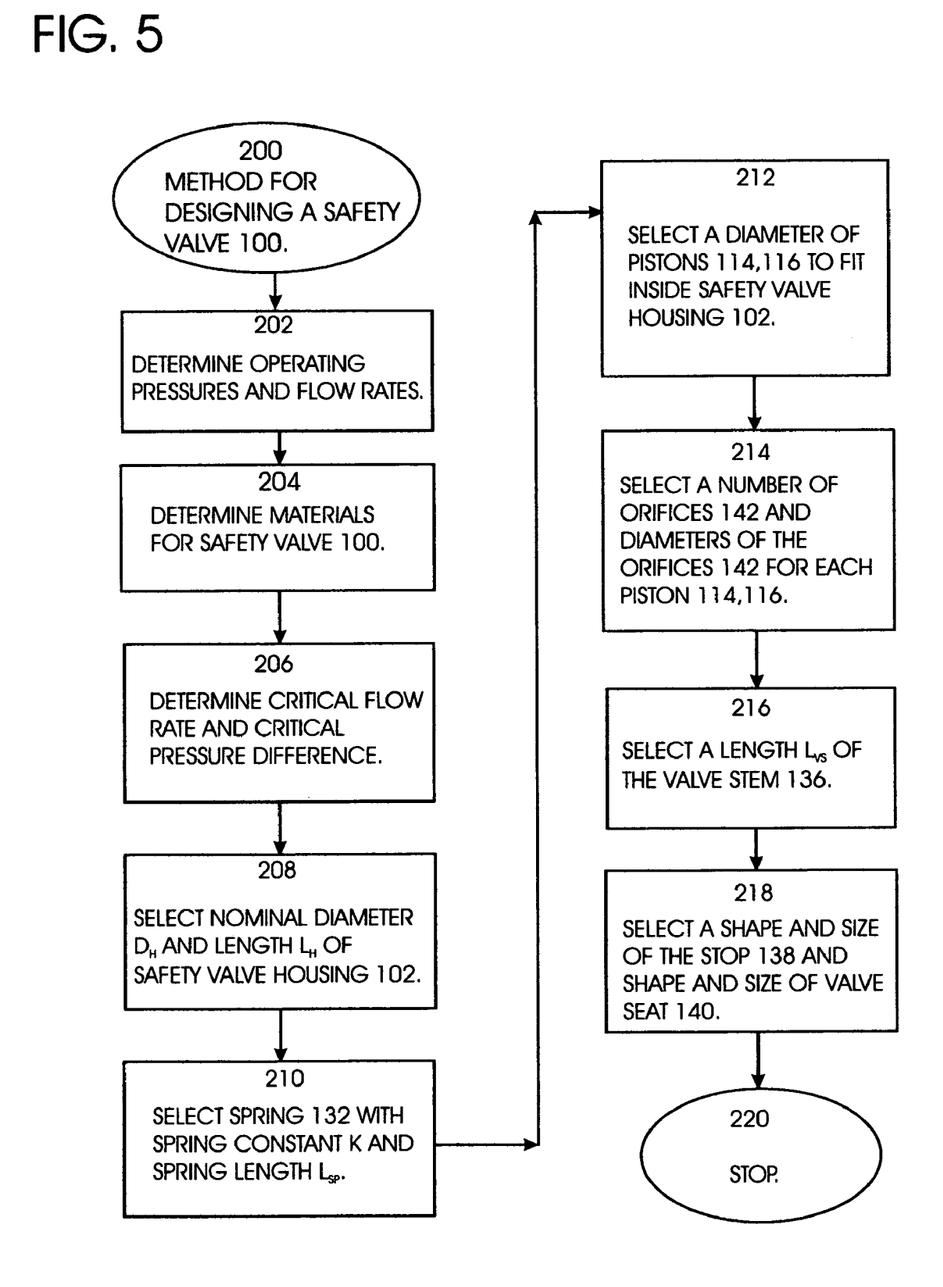
FIG. 5 is a flow chart for designing a safety valve in accordance with a preferred embodiment of the present invention.

FIG. 5 shows a flow chart for a method for designing the safety valve 100 of the present invention. For this flow chart, the steps of the method may be carried out in any order except where one step necessarily precedes another step. The method begins at step 200.

At step 202, a designer specifies the normal operating conditions for the safety valve 100, such as the pipeline size, the fluid flowing in the pipeline and a range of normal pipeline pressures and normal flow rates. At step 204, the designer specifies the material to be used for the safety valve 100 based on the fluid flowing in the pipeline. At step 206, given the normal operating conditions, the designer specifies a desired critical pressure difference between the pressure upstream and downstream of the safety valve 100, above which the safety valve 100 is designed to close. The designer may also express this critical pressure difference as a critical flow rate based on predetermined correlations and measurements.

At step 208, the designer selects a safety valve housing nominal diameter $D_H$ and length $L_H$. At step 210, the designer selects a spring 132 with spring constant K and length $L_{SP}$. The spring length $L_{SP}$ is selected so that the spring 132 is under a slight compression or "preload" when the spring 132 and piston assembly 144 are assembled in the housing. The exact amount of the preload will vary depending on the particular application. At step 214, the designer selects two pistons, each having a diameter slightly smaller than the internal diameter of the housing 102. At step 216, the designer selects a number N of orifices 142 having diameters of $D_O$. For a safety valve 100 of a given size, the selection of the number of orifices 142, the orifice diameter $D_O$, and the spring constant K determine the critical pressure difference and the critical flow rate at which the safety valve 100 will close.

The spring length $L_{SP}$ and the spring constant K will determine the stroke S that the pistons will travel between open and closed positions of the valve for a given housing length L. The stroke S should be of a sufficient length to prevent the safety valve 100 from repeatedly opening and closing when the pressure difference across the safety valve is near the critical pressure difference. The design of the piston assembly 144, with a relatively long valve stem length $L_{vs}$ and a relatively long spring length $L_{SP}$ prevent the valve from opening and closing when the valve is operating near the critical pressure difference and critical flow rate. Generally, the stroke S should be nominally 15-20% of the uncompressed length $L_{SP}$ of the spring 132, and should in all cases be less than one third of $L_{SP}$. The purpose of this restriction on the stroke S is to ensure that the spring 132 deflects only in the linear range, so that the deflection of the spring 132 as a function of force can be reliably determined. For some embodiments, the spring length $L_{SP}$ is about 75-85% as long as the housing length $L_H$.

In selecting the number of orifices 142 and the orifice size $D_O$, it is also generally desirable to minimize the pressure drop across the safety valve 100 with the safety valve 100 in the open position while insuring reliable operation of the safety valve 100. It is expected that this pressure drop will increase with decreasing size of the orifice 142, but this is a general rule subject to exceptions for particular designs.

In one embodiment, the first piston 114 has more than two orifices 142 and the second piston 116 has two orifices 142, and the size of the orifices 142 in the first piston 114 is smaller than the size of the orifices 142 in the second piston 116. In this embodiment, the first piston 114 acts as a filter to remove to remove contaminants from the fluid stream. In another embodiment, a fluid screen is placed in the pipeline upstream of the safety valve to remove contaminants before they reach the safety valve 100. When the fluid being pumped through the pipeline is known to have contaminants, it is important to have a mechanism to remove the contaminants or the contaminants may block the orifices 142.

As a rule of thumb, it has been found that the safety valve 100 operates well for a gaseous fluid when a sum of the areas of all the orifices 142 is 2 to 3 times less than the area of the inlet passage 111. Furthermore, it is generally believed that two orifices 142 on each piston 114 and 116 are sufficient for proper operation of the safety valve 100 in a gas pipeline.

At step 216, the designer must specify the length $L_{vs}$ of the valve stem 136. The length $L_{vs}$ of the valve stem 136 is selected so that the spring 132 fits between the second piston 116 and the outlet coupler inner face 134, applying a predetermined force to the second piston 116 to prevent the stop 138 from engaging the valve seat 140. Finally, at step 218, the designer specifies the shape of the stop 138 and valve seat 140. The method ends at step 220.

Following the method for designing a safety valve 200, a manufacturer may conduct tests and generate a series of tables to make the selection of the safety valve 100 simply a matter of looking up in a table which safety valve 100 is required for a particular application. The designer may choose many of the design critereria based on experience, rules of thumb, and other imprecise rules of design. However, assuming that all the other criteria are determined, the choices of the number of orifices, the orifice diameters and the spring constant will determine the critical flow rate at which the safety valve 100 will close For a first example, assume that all the design criteria are known except the orifice size and spring constant are known. Table 1 provides an example of the type of correlation between the orifice size, the number of orifices 142, and the spring constant K. One can look at Table 1 and determine the orifice size required for the safety valve to close at the desired critical flow rate for various combinations of spring constant and the number of orifices.

Another example of the type of correlation that can be determined experimentally is shown in Table 2. For Table 2, it is assumed that all the other design criteria have been specified except the orifice size, the critical flow rate, and the spring constant From Table 2, if one is given a particular orifice size and a critical flow rate, one can then determine the spring constant to use to cause the safety valve to close at that critical flow rate.

It must be noted that none of the actual numerical values given by Tables 1 and 2 have yet been determined. These tables are only meant to demonstrate the types of experimental correlations that a manufacturer can provide to designers to assist designers in the design of the safety valve 100 for particular applications.

Figure 6:
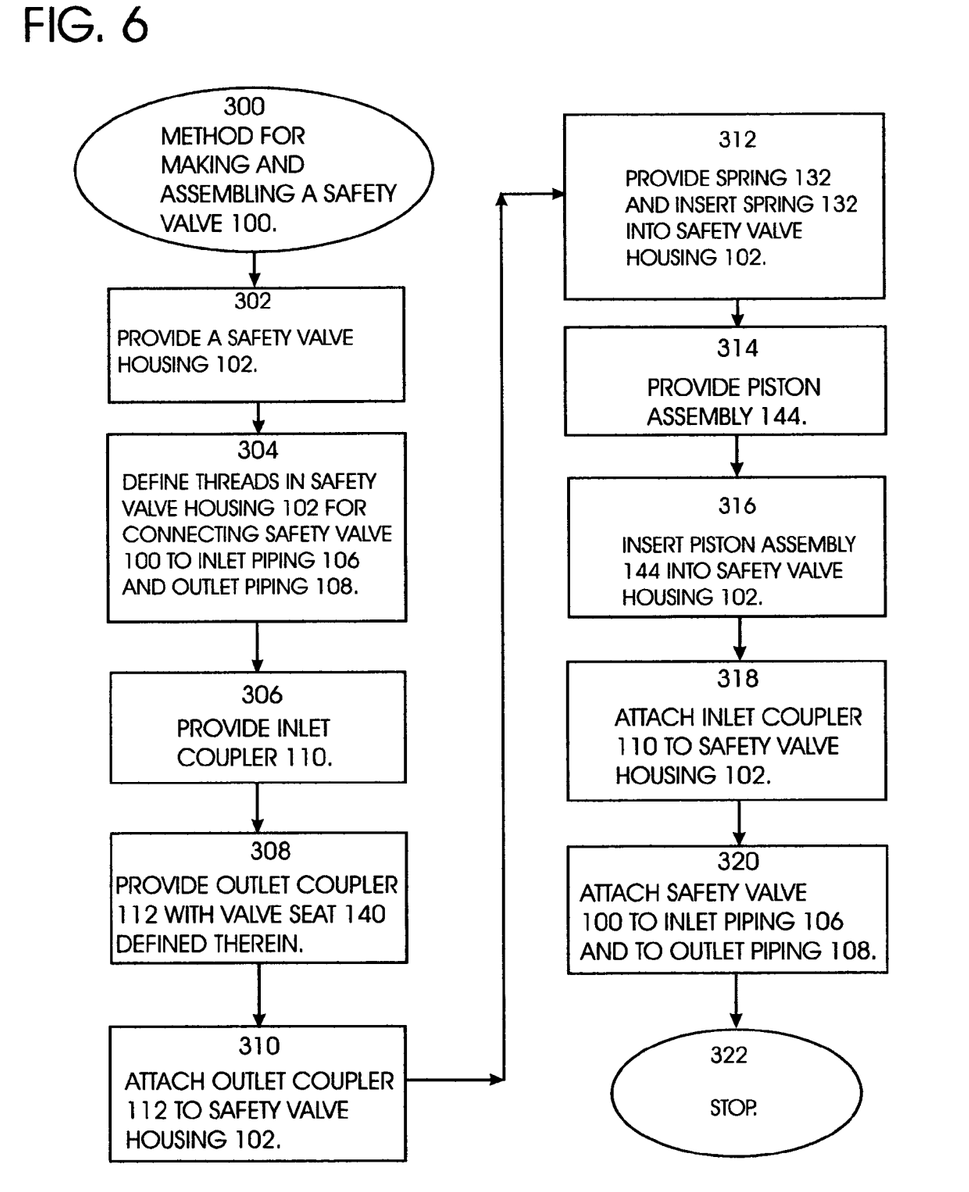
FIG. 6 is a flow chart for making and assembling a safety valve in accordance with a preferred embodiment of the present invention.

FIG. 6 shows a flow chart for a method of making and assembling the safety valve 100. The flow chart begins at step 300. The steps for the method of making and assembling the safety valve may be performed in any order, except where one step necessarily follows another step. At step 302, the person making and assembling the safety valve 100 (maker) provides a safety valve housing 102 larger than the size of the piping to which the safety valve 100 is attached. The safety valve housing 102 is a length of pipe made from a material suitable for the fluid being transported in the piping.

At step 304, threads are defined in the safety valve housing 102. The threads may be internal or external threads. As shown in FIGS. 1-2, the threads on the safety valve housing 102 that attach the housing to the inlet and outlet couplers 110 and 112 are internal. At step 306, the maker provides an inlet coupler 110 to connect the safety valve housing 102 to the inlet piping 106.

For the embodiment shown in FIG. 1-2, the inlet coupler 110 and the outlet coupler 112 are: (1) externally threaded on one end to connect to the internal threads on the housing and (2) are internally threaded on the other end to connect to externally threaded inlet and outlet piping. For the case where the safety valve is retrofitted to an existing fluid line, one would expect to cut a section of the existing fluid line in two places, remove the section of fluid line between the two cuts, thread ends of the existing fluid line where the cuts have been made, and install the safety valve. Various pipe couplers are available for: (1) connecting two externally threaded sections of pipe; (2) to connect an internally threaded pipe to another internally threaded pipe; or to (3) connect an externally threaded pipe to an internally threaded pipe. The choice of whether to use internal or external threads will depend largely on the application for which the piping is being used.

At step 308, the maker provides an outlet coupler 112. In some embodiments, the outlet coupler 112 is made of cast material, such as aluminum and a valve seat 140 is shaped and sized in the outlet coupler 112 when the outlet coupler 112 is cast to matingly receive the stop 138. In other embodiments, the outlet coupler 112 is provided as an off-the-shelf item from a hardware supplier. For this embodiment, the valve seat 140 is defined in the outlet coupler 112 by using appropriate tools to chamfer an edge of a the outlet passage 113 until a portion of the valve seat is conical in shape to matingly receive the stop 138. One appropriate tool for chamfering the edge of the passageway is a rotary grinding tool. After the valve seat 140 is defined in the outlet coupler 112, the outlet coupler 112 is then attached to the safety valve housing at step 310

At step 312, the maker provides a spring 132 designed in accordance with the method shown in FIG. 5 and inserts the spring 132 into the safety valve housing 102 against the outlet coupler 112.

At step 314, the maker provides and assembles a piston assembly 144. The piston assembly 144 includes the shaft 122, the valve stem 136, the first piston 114, the second piston 116, and the stop 138. In one embodiment, the piston assembly 144 is cast as a unitary casting, with the orifices 142 defined in the casting. In a second embodiment, the piston assembly 144 is cast as a unitary casting and the orifices 142 are drilled into the unitary casting.

Figure 7:
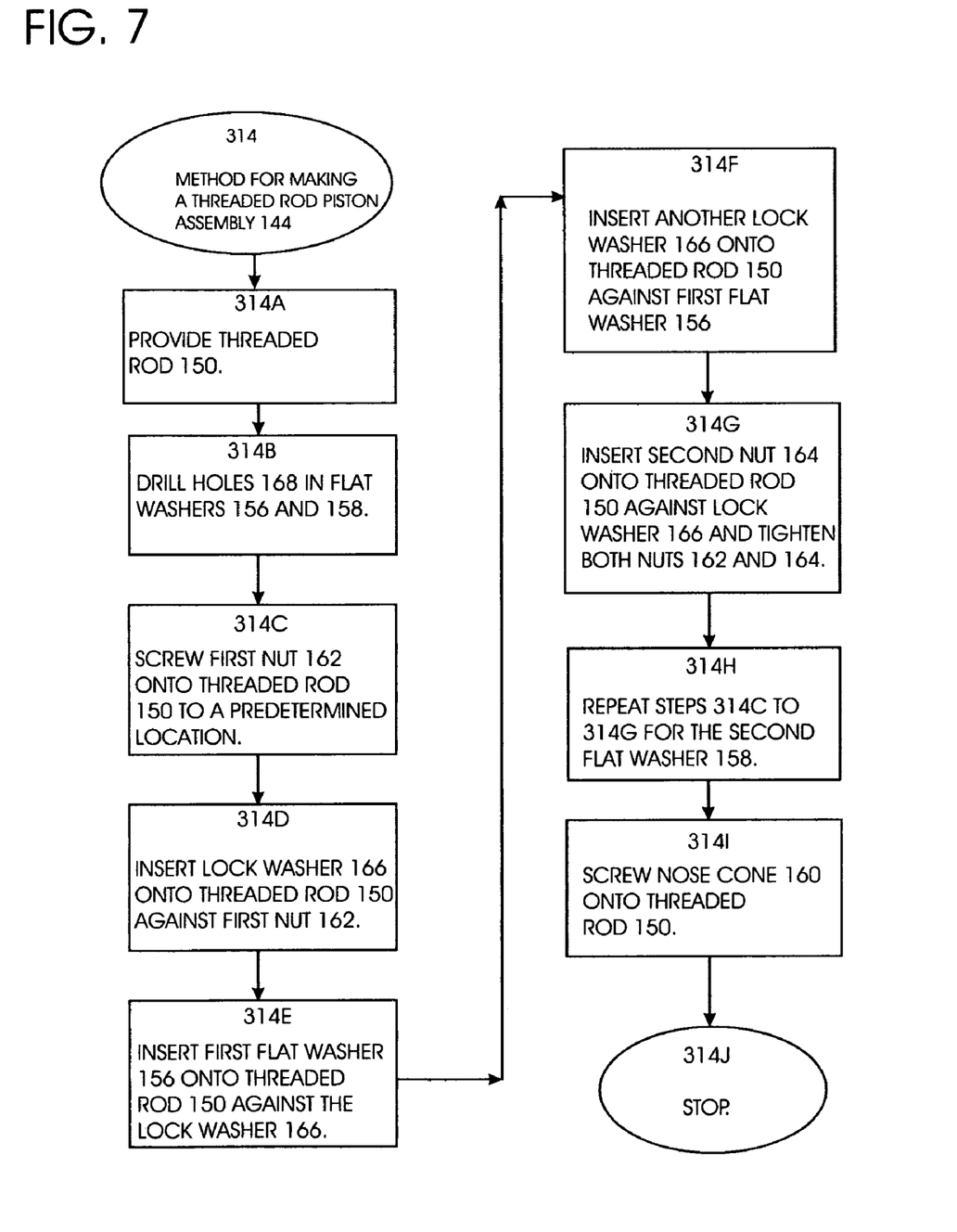
FIG. 7 is a flow chart for assembling a piston assembly on a threaded rod in accordance with a preferred embodiment of the present invention.

FIG. 7 is a flow chart for yet another embodiment of a method for performing step 314 in FIG. 6. Referring briefly to FIG. 7, the method begins at step 314A. At step 314B, a threaded rod 150 is provided for attachment of several components of the piston assembly 144. At step 314B, the flat washers 156 and 158 are drilled to define holes 168. At step 314C, the first nut 162 is screwed onto the threaded rod 150 to a predetermined thread location. At step 314D, the lock washer 166 is inserted on the threaded rod 150 against the first nut 162. At step 314E, the first flat washer 156 is inserted onto the threaded rod 150 against the lock washer 166. At step 314F, a second lock washer 166 is inserted onto the threaded rod against the first flat washer 156. At step 314G, the second nut 164 is screwed onto the threaded rod 150 and tightened against the second lock washer 166. At step 314H, the steps 314C through 314G are then repeated for the second flat washer 158 to attach the second flat washer 158 to the threaded rod 150 at a predetermined location. At step 314I, the internally threaded nose cone 160 is screwed onto the threaded rod 150. The method stops at step 314J and the making of the piston assembly 144 is complete.

Returning to FIG. 6, at step 316, the maker inserts the piston assembly 144 into the safety valve housing 102 against the spring 132. At step 318, the inlet coupler 110 is screwed into the safety valve housing 102. A length $L_{P4}$ of the piston assembly 144 and the spring length $L_{SP}$ should be selected so that the inlet coupler 110 slightly compresses the spring 132 when the inlet coupler 110 is screwed into the safety valve housing 102. It is in attaching the inlet coupler 110 that the preload is applied by the amount that the inlet coupler 110 is screwed into the threads on the housing 102.

At step 320, the safety valve 100 is attached to the inlet piping 106 and the outlet piping 108 to complete the installation of the safety valve 100 in the piping system. For each attachment of the safety valve 102 to the inlet coupler 110, and the outlet coupler 112, and for the attachment of the inlet coupler 110 and the outlet coupler 112 to the upstream piping 106 and the downstream piping 108, it is recommended that the attachment be made using a wrench that fits onto two of the flat sides 115 of the hexagonal portion of the inlet coupler 110 and the outlet coupler 112. The method stops at step 322.

Figure 8:
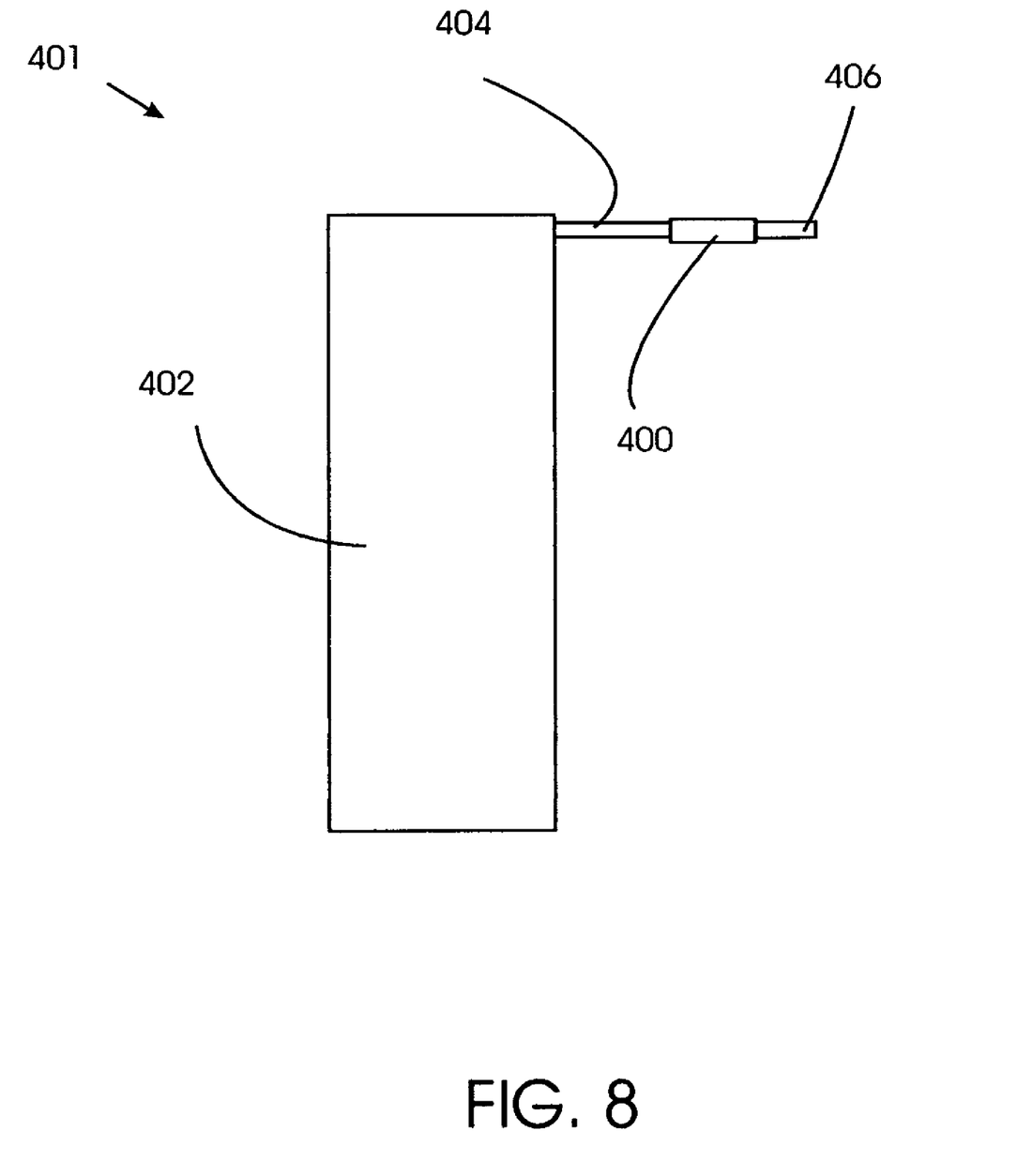
FIG. 8 is a schematic representation of a safety valve of the present invention installed on a gasoline pump.

FIG. 8 shows a schematic representation of a gasoline dispensing system 401, with a safety valve 400 of the present invention installed at a gasoline pump 402. Gasoline exits the gasoline pump 402 via the pump exit piping 404. The exit piping 404 acts as the inlet piping 106 to the safety valve 100 shown in FIGS. 1-2. Gasoline exits the safety valve 400 through the safety valve outlet piping 406, which is connected to a flexible hose. The safety valve 400 is configured internally exactly like the safety valve 100, and acts to shut off the flow of gasoline when there is a break in the piping downstream of the safety valve 400. Thus, a catastrophic failure occurs downstream of the safety valve 400 occurs when a motorist drives off from the gasoline pump 402 with a fill nozzle still in his automobile gasoline tank. When the catastrophic failure occurs, the safety valve 400 shuts down the flow of gasoline to the nozzle.

Although the example shown in FIG. 8 and discussed in the preceding paragraph is for a gasoline pump, the same principles apply to a fill station for an LP gas tank.

Figure 9:
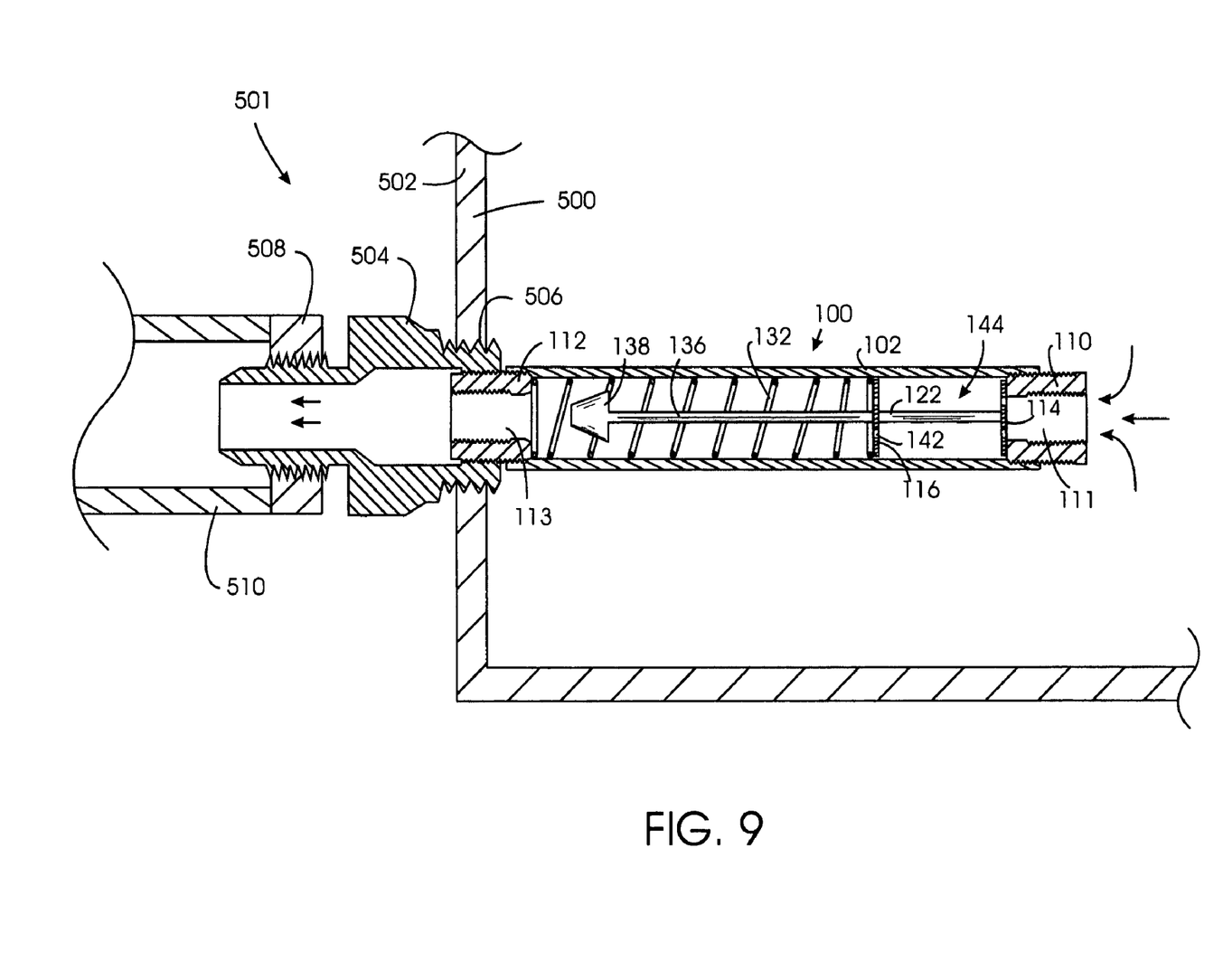
FIG. 9 is a partial cross-sectional view of a spill prevention system having a safety valve installed in one of two fuel tanks of a truck in accordance with a preferred embodiment of the present invention.

FIG. 9 is a partial cross-sectional view of a spill prevention system 501 having a safety valve 100 installed in one of two fuel tanks 500 of a truck. The safety valve 100 shown in FIG. 9 is identical to the embodiment shown in FIGS. 1-2 between the inlet coupler 110 and the outlet coupler 112. The inlet piping 106 of FIGS. 1-2 is not necessary because the safety valve 100 is immersed in the fuel of the fuel tank 500. Furthermore, instead of being connected to outlet piping 108 as in FIGS. 1-2, the outlet coupler 112 is connected to a reducer fitting 504 that penetrates a wall 502 of the fuel tanks 500.

The reducer fitting 504 is threaded externally at both ends and is threaded internally at the end having a larger diameter than its other end. The outlet coupler 112 screws into the internal threads of the reducer fitting 504. The reducer fitting 504 threads into threads defined in a tank wall 502 and connects to a flexible hose 510. The flexible hose 510 is connected to the reducer fitting 504 by a hose coupler 508, which is in turn attached to the flexible hose 510.

Figure 10:
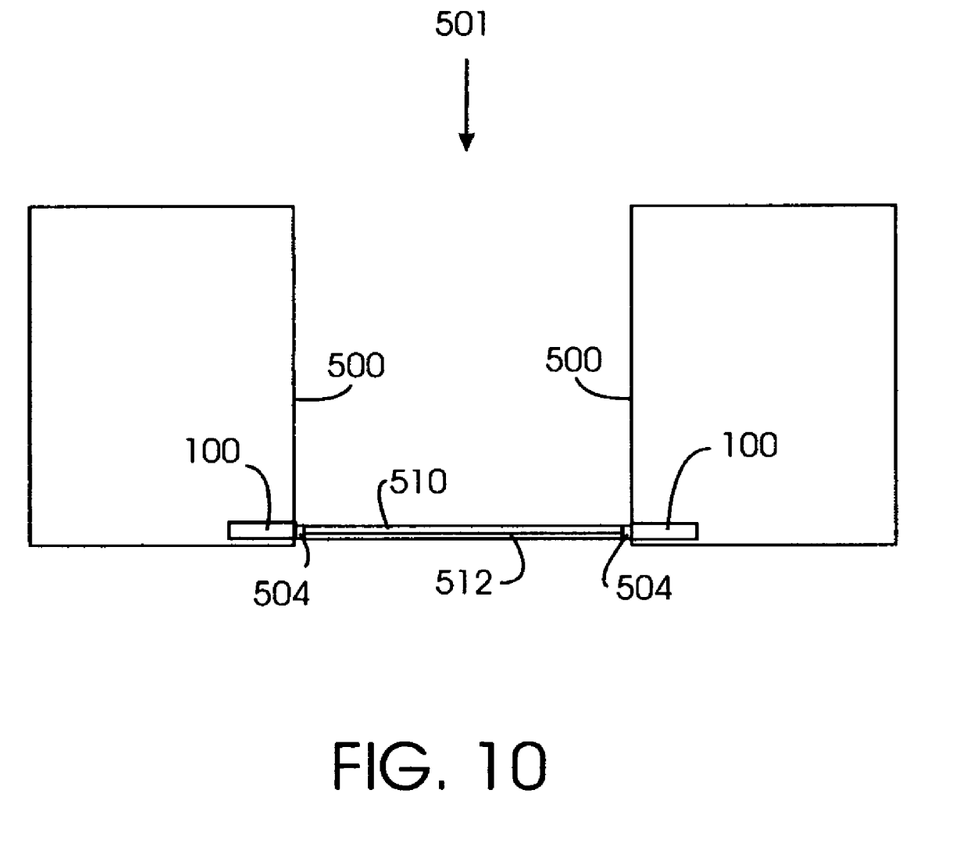
FIG. 10 is a side elevation, schematic view of the spill prevention system partially shown in FIG. 9.

As best seen in FIG. 10, the flexible hose 510 extends from the reducer fitting 504 on one fuel tank 500 to a like reducer fitting 504 on a second fuel tank 500. The second fuel tank 500 has a safety valve 100 configured exactly like the safety valve 100 on the first fuel tank 500. A trip wire 512 is attached to the flexible hose 510. The trip wire 512 is connected to the electrical system of the truck and is configured to indicate to a truck driver in a cab of the truck whenever the trip wire 512 is broken.

In operation, fluid is allowed to pass through the safety valves 100 and the flexible hose 510 under normal operating conditions to balance the weight distribution on the truck. This is desirable because an unbalanced load on a truck may cause the truck to have an accident. This allows fuel to flow from one tank 500 to another tank 500 if there is a difference in the amount of fuel in each tank 500. The pressure driving the flow would be the incremental static head pressure that occurs in one tank 500 when that tank 500 has more fuel than the other tank 500. Normally, there will be a relatively low flow rate between the two fuel tanks 500.

However, if the flexible hose 510 breaks, each safety valve 100 senses the change in flow rate through each safety valve 100, by way of the increased the pressure difference between each safety valve's inlet coupler 110 and its respective outlet coupler 112, and thus causes each safety valve 100 to close. As discussed above for the safety valve 100, with all other dimensions of the safety valve 100 being constant, the spring constant K, the number of orifices 142, and the size of the orifices 142 can be varied to produce a safety valve 100 that closes at a precise flow rate. The precision with which the safety valve 100 operates is largely due to the fact that the piston assembly 144 can be designed to have a very low mass.

Although the situation has been described where there is a catastrophic break in the flexible hose 510, other situations could also result in an increased flow rate in the flexible hose 510. For example, if one of the fuel tanks 500 had a substantial leak, the fuel would ordinarily also flow at a higher flow rate from one fuel tank 500 to the other. However, with the safety valve 100 installed as shown in FIG. 10, the flow of fuel between the two tanks 500 would cease if the flow rate exceeded a specified amount.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

TABLE 1

DIAMETER OF EACH ORIFICE (cm)

| Number of Orifices in Each Piston | Spring Constant (N/m) | | |
|---|---|---|---|
| | 0.5 | 1.0 | 2.0 |
| 2 | A | B | C |
| 3 | D | E | F |
| 4 | G | H | I |

TABLE 2

SPRING CONSTANT [N/m]

| CRITICAL FLOW RATE [CUBIC METERS/HR] | ORIFICE SIZE (SQ. CM.) | | |
|---|---|---|---|
| | 0.2 | 0.4 | 0.5 |
| 5 | A | B | C |
| 6 | D | E | F |
| 7 | G | H | I |

What is claimed is:

1. A safety valve for use with a fluid piping system, the piping system having an upstream portion upstream of the safety valve and a downstream portion downstream of the safety valve, the safety valve comprising:
(a) a cylindrical housing through which the fluid flows, the housing having a diameter;
(b) a piston assembly comprising:
   (b1) a first disc-shaped piston having a diameter slightly smaller than the housing diameter such that the first piston freely slides within the housing, wherein the first piston has at least one orifice defined therein, and wherein the first piston has an upstream face and a downstream face;
   (b2) a second disc-shaped piston positioned downstream from the first piston, the second piston having a diameter substantially equal to the first piston diameter, wherein the second piston has at least one orifice defined therein, wherein the second piston has an upstream face and a downstream face, and wherein fluid entering the safety valve housing exerts a fluid force on the first piston and the second piston in the direction of fluid flow;
   (b3) a shaft connecting the first piston to the second piston;
   (b4) a valve stem extending from the downstream face of the second piston, wherein the second piston is attached to a first end of the valve stem; and
   (b5) a stop attached to a second end of the valve stem;
(c) a valve seat with an opening substantially shaped and sized to matingly receive the stop; and
(d) a spring positioned in the housing against the downstream face of the second piston assembly such that the spring exerts a spring force on the second piston in a direction opposite the general direction of fluid flow, wherein when the fluid forces acting on the piston assembly sufficiently exceed the spring force acting on the downstream face of the second piston, the piston assembly moves in the direction of fluid flow until the stop engages the valve seat and substantially shuts off the fluid flow to the downstream portion of the system piping.

2. The safety valve of claim 1 further comprising an inlet coupler that connects the safety valve to the upstream portion of the fluid piping system, wherein fluid enters the safety valve through an inlet passage defined in the inlet coupler.

3. The safety valve of claim 1 further comprising an outlet coupler to connect the safety valve to the downstream portion of the fluid piping system, wherein fluid exits the safety valve through an outlet passage defined in the outlet coupler.

4. The safety valve of claim 1 wherein the spring is positioned between the outlet coupler and the second piston.

5. The safety valve of claim 1 wherein the stop has a frusto-conical shape.

6. The safety valve of claim 5 wherein the valve seat defines an opening with a frustro-conical shape to matingly engage the stop.

7. The safety valve of claim 1 wherein the piston assembly has a stroke no more than a third as long as the length of the spring so that the relation between the force acting on and exerted by the spring is linearly related to a deflection of the spring.

8. The safety valve of claim 1 wherein the piston assembly is cast as a single contiguous unit.

9. The safety valve of claim 1 wherein the shaft and the valve stem comprise one continuous rod.

10. The safety valve of claim 9 wherein the first piston and the second piston each comprise a flat washer.

11. The safety valve of claim 1 wherein a sum of an area of the first piston orifice added to an area of the second piston orifice is no more than half as large as an area of the inlet passage.

12. A gasoline dispensing system, comprising:
(a) a gasoline pump;
(b) exit piping through which gasoline exits the gasoline pump;
(c) the safety valve of claim 1 positioned downstream of the exit piping;
(d) safety valve outlet piping, wherein when a catastrophic break occurs downstream of the safety valve outlet piping, the safety valve closes to shut down the flow of gasoline.

13. A piston assembly for a valve that closes when fluid forces acting on the piston assembly exceed a spring force exerted on the piston assembly by a spring positioned within a housing of the valve, the valve housing having a diameter, the piston assembly comprising:
(a) a first disc-shaped piston having a diameter slightly smaller than the housing diameter such that the first piston freely slides within the housing, wherein the first piston has at least one orifice defined therein, and wherein the first piston has an upstream face and a downstream face;
(b) a second disc-shaped piston positioned downstream from the first piston, the second piston having a diameter substantially equal to the first piston diameter, wherein the second piston has at least one orifice defined in the second piston, wherein the second piston has an upstream face and a downstream face, and wherein fluid entering the safety valve housing exerts a fluid force on the first piston and the second piston in the direction of fluid flow;
(c) a shaft connecting the first piston to the second piston;

(d) a valve stem extending from the downstream face of the second piston, wherein the second piston is attached to a first end of the valve stem; and (e) a stop attached to a second end of the valve stem wherein the stop is shaped and sized to matingly engage a valve seat positioned in the housing downstream of the valve stem, wherein when the fluid forces acting on the piston assembly exceed the counteracting spring force, the piston assembly moves in the housing and the stop matingly engages the valve seat to stop the flow of fluid through the safety valve.

14. The piston assembly of claim 13 wherein the stop has a frusto-conical shape.

15. The piston assembly of claim 13 wherein the piston assembly is cast as a single contiguous unit.

16. The piston assembly of claim 13 wherein the shaft and the valve stem comprise a threaded rod.

17. The piston assembly of claim 16 wherein the stop is a nose cone that is screwed onto the threaded rod.

18. The piston assembly of claim 16 wherein the first piston is a first flat washer and the second piston is a second flat washer.

19. The piston assembly of claim 18 wherein the orifices are defined in the first piston and the second piston by drilling.

20. The piston assembly of claim 17 further comprising:

(a) a first nut;

(b) a second nut; and (c) lock washers, wherein a position of each of the first and second flat washers is fixed by screwing the first nut onto the threaded rod, positioning the first lock washer against the first nut, positioning one of the first and second flat washers against the lock washer, positioning a second lock washer against the flat washer, and tightening the second nut against the second lock washer.

* * * * *

UNITED STATES PATENT AND TRADEMARK OFFICE
CERTIFICATE OF CORRECTION

PATENT NO.        : 7,258,131 B2                                    Page 1 of 1
APPLICATION NO.   : 11/220080
DATED             : August 21, 2007
INVENTOR(S)       : Donald Gary Eichler It is certified that error appears in the above-identified patent and that said Letters Patent is hereby corrected as shown below:

Column 11, line 61, second line of paragraph (d) of Claim 1, please delete "assembly"

Signed and Sealed this

Twelfth Day of May, 2009

JOHN DOLL
*Acting Director of the United States Patent and Trademark Office*